April 2, 1946.  J. T. POTTER  2,397,562
AUDIENCE DEMAND METER
Filed Feb. 18, 1944　　4 Sheets-Sheet 2

Inventor
JOHN T. POTTER
By James H. Littlepage
Attorney

Inventor
JOHN T. POTTER
By James H. Littlepage
Attorney

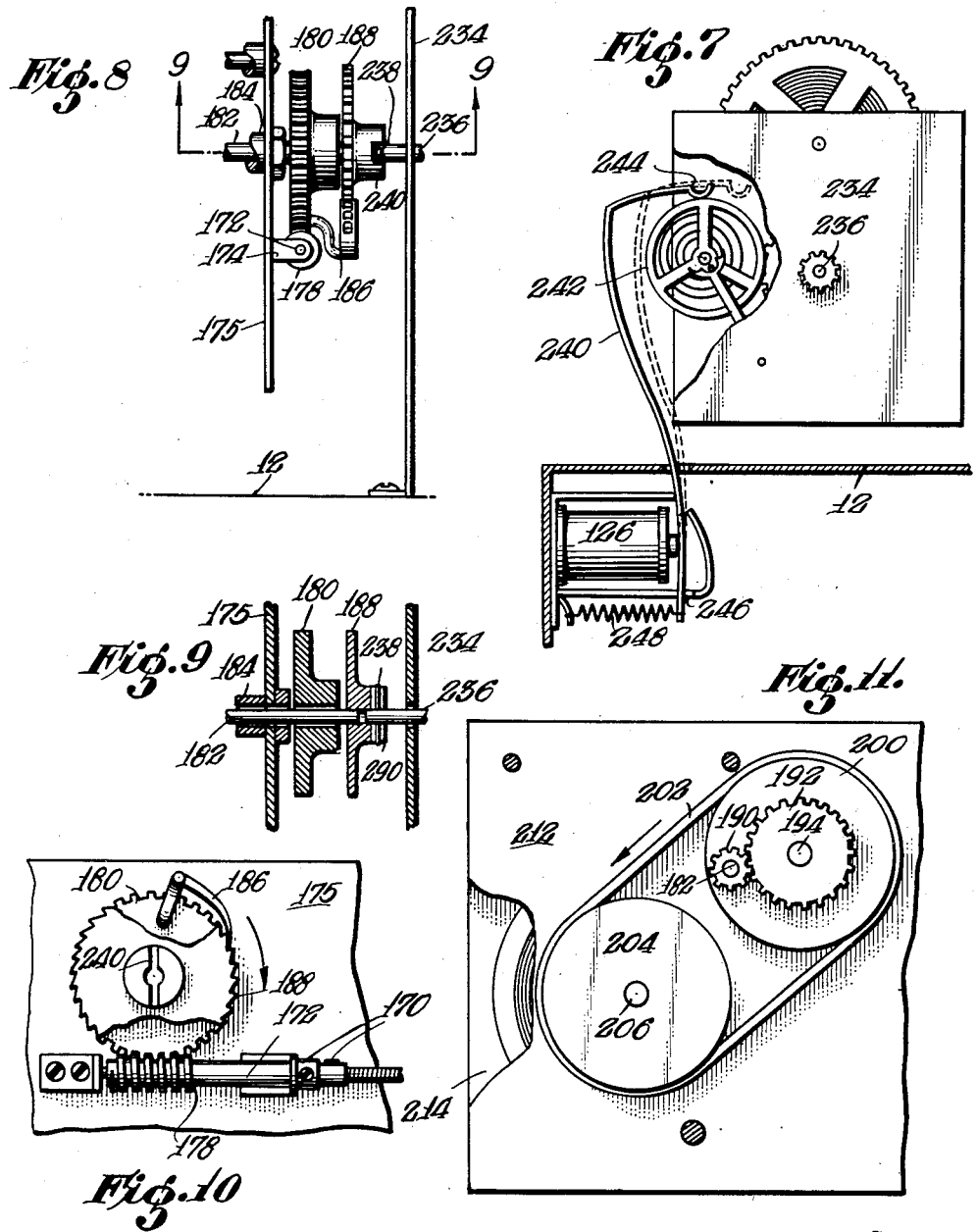

Patented Apr. 2, 1946

2,397,562

UNITED STATES PATENT OFFICE 2,397,562

AUDIENCE DEMAND METER

John T. Potter, Manhasset, N. Y.

Application February 18, 1944, Serial No. 522,981

3 Claims. (Cl. 234—76)

This invention relates to radio audience meters and, more particularly, concerns a meter for recording the operation of a radio receiver.

The primary object of this invention is to provide a meter which may be installed at or near a broadcast receiver and by means of which, after a period of time such as a few days or a week, it may be ascertained when the receiver was operated, and to which wavelengths the receiver was tuned. Knowing the programs then being broadcast, it is therefor possible to determine the relative popularity of programs by comparing records of the several meters used in a survey.

One of the objects is to provide a meter electronically coupled to a broadcast receiver and responsive to the momentary frequency to which the receiver is tuned. While other receiver outputs might be utilized, it is preferred to derive a signal from the local oscillator of a superheterodyne receiver, since such a signal bears a constant relationship to the frequency to which the receiver is tuned. Broadly, the meter is intended to include a tunable circuit having one or more variable capacitors, a synchronous electric motor for constantly tuning the capacitor back and forth across a band of frequencies, a recording device including a normally non-marking stylus driven by the motor back and forth across a constantly driven recording medium, and a relay in the output of the tuned circuit so that when the tuned circuit resonates with the receiver output, the relay actuates the stylus to mark the medium.

In meters of the present type where a synchronous electric motor is used to drive the recording medium, several difficulties have been encountered, particularly that of power interruption, which ordinarily stops the tape and ruins the time base. By this invention, it is proposed to provide a normally inoperative and normally uncoupled spring clock motor, a relay in the power circuit for normally disabling the clock motor but which positively starts the motor upon power interruption, and a one-way clutch for thereupon drivingly connecting the clock motor and tape drive and for simultaneously disconnecting the synchronous electric motor from the tape drive.

Still another object is to provide a combined stylus and capacitor hunting assembly, the elements of which are reciprocated as a unit by the synchronous electric motor only, and which are disabled upon power interruption. Yet again, in the hunting unit, it is proposed to provide gearing driving the capacitor shaft which may be readily disconnected for indexing.

These and other objects will appear from the following specifications and drawings, in which:

Fig. 5 is an elevation showing the details as seen from the line 5—5 of Fig. 2;

Fig. 6 shows the detail in elevation as seen from the line 6—6 of Fig. 2;

Fig. 7 shows the detail of the spring clock motor and the disabling and starting mechanism therefor;

Fig. 8 shows in elevation the detail of the gearing between the synchronous electric motor, the spring clock motor, and the tape drive;

Fig. 9 is a section along the line 9—9 of Fig. 8;

Fig. 10 shows in elevation a detail of the gearing illustrated in Figs. 8 and 9; and, Fig. 11 is an elevation showing the detail of the tape drive.

Figure 1:
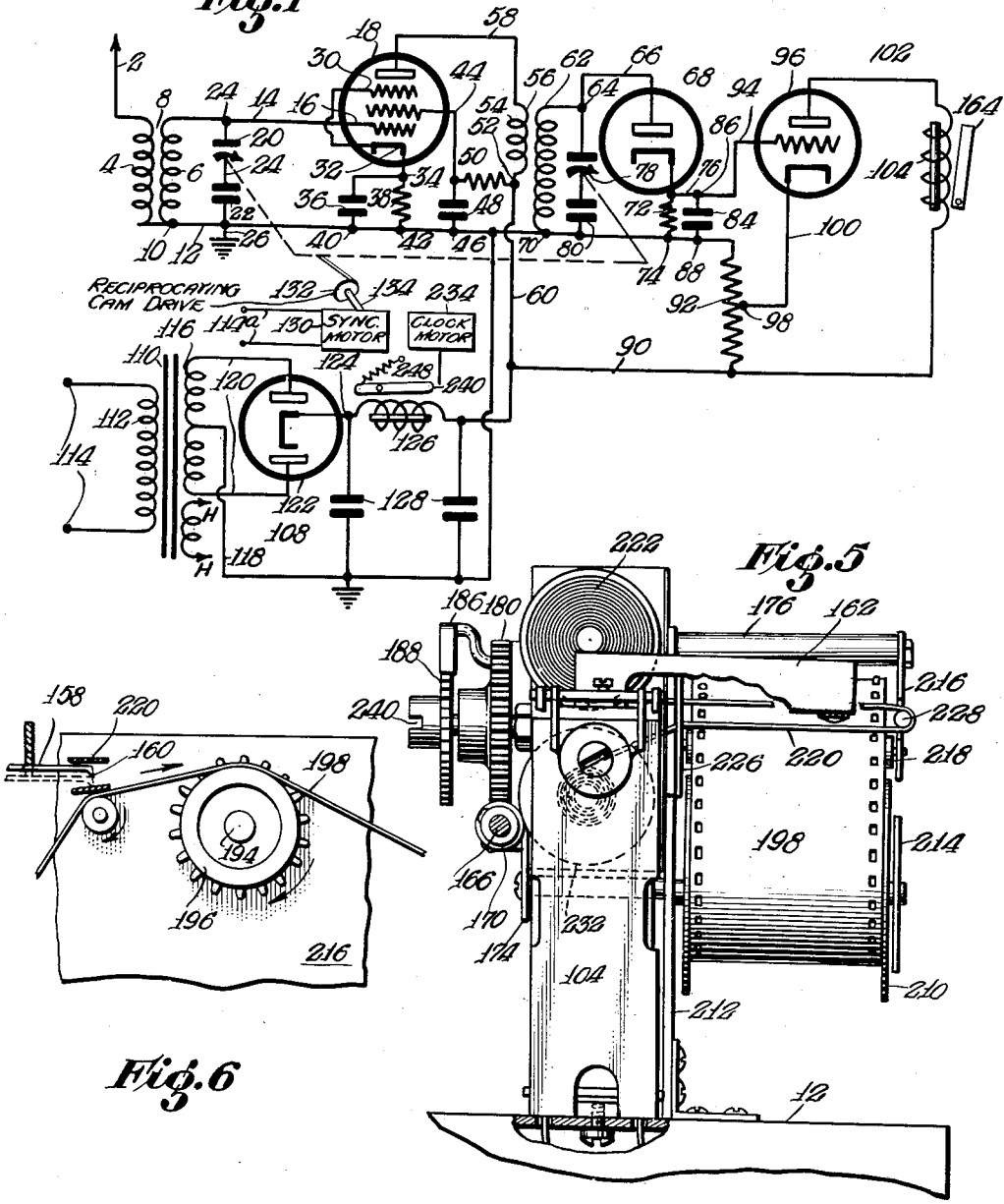
Fig. 1 is a diagram of the circuit.

Referring now to the drawings, in which like numerals denote like or similar objects, the electrical circuit may best be understood by reference to the diagram of Fig. 1, wherein the input 2 is shown connected to the primary winding 4 adjacent the secondary winding 6 of an input transformer 8, one end of each winding 4 and 6 being connected at 10, 10 to chassis 12. It should be understood that input 2 is adapted for connection or coupling to a broadcast receiver, and preferably to the output of the local oscillator of a superheterodyne receiver.

The non-grounded end of secondary winding 6 is connected to lead 14 of control grid 16 of a pentode 18, and between grid lead 14 and the chassis at 26 are connected 24 in series the first section 20 of a variable gang capacitor 20 and a fixed capacitor 22, thereby forming with secondary winding 8 a tunable circuit capable of resonating with the input signal. Pentode 18 further includes a suppressor grid 30 connected to the cathode 32 which in turn is connected at 34 through capacitor 36 and resistor 38 to the chassis at 40 and 42 respectively.

The screen grid lead 44 of the pentode is connected to the chassis at 46 through capacitor 48 and through a resistor 50 to one end 52 of the primary winding 54 of a coupling transformer 56, the other end of winding 54 being connected to plate lead 58. Also connected at 52 is the plate power supply line 60 which has in series the winding of relay 126 described below.

One side of secondary winding 62 of transformer 56 is connected at 64 through lead 66 to one side of a rectifier 68, the other side of the winding 62 being connected as shown at 70 to the chassis and through resistor 72 at 74 to the other side of rectifier 68 at 76. Connected across winding 62 are the second section 78 of a variable gang capacitor 78 and a fixed capacitor 80 in series as shown at 82, so that relatively sharply tuned resonant circuits are provided, the rectified output of which is passed to an amplifier as follows: capacitor 84 is connected at 86, 88 between the chassis and the output side of rectifier 68, which is connected to grid lead 94 of amplifier 96; plate power supply 68 is connected by lead 90 to the chassis through resistor 92 which is variably connected at tap 98 to cathode lead 100.

The output circuit 102 of amplifier 96 has therein the winding of a stylus relay 104, the output circuit being adjustable at tap 98 so that whenever resonance occurs in the preceding tuned circuits, the relay is actuated.

Power supply, designated 108, includes the usual power transformer 110 having a primary winding 112 adapted for connection to a 60 cycle domestic power system at 114, and a secondary winding connected at H—H for the tube heaters. Plate power is obtained from secondary winding 116 having a mid-tap connected by lead 118 to the chassis and ends connected at 120 to rectifier 122, the output of which is connected at 124 to plate power supply line 68 through the winding of clock control relay 126, both ends of which are connected through capacitors 128 to the chassis so that when the power supply is on, relay 126 is energized.

Also connected to the domestic power supply at 114a is synchronous electric motor 130 driving a cam 132 through shaft 134, whose function may best be seen in Figs. 2 to 5 inclusive.

Motor 130 drives shaft 134 through reduction gearing 136, the assembly being supported on chassis 12 by brackets 138 on which also are mounted guides 140 slidably supporting horizontal rod 142 carrying intermediate its ends a cam follower wheel 144. On the end of rod 142 is affixed a leaf spring 146 resiliently maintaining the rod 142 and its related parts upright. Rod 142 rigidly carries a rack 148 normally meshing with a pinion 150 on shaft 152 of variable gang capacitors, and a coil spring 154 has its inner end secured to shaft 152 and its outer end anchored at 156 to the capacitor frame so that the cam follower, through pinion 150, rack 148, and rod 142, hereinafter called the hunt assembly, is biased against cam 132. Finally, the hunt assembly includes a spring stylus arm 158 affixed to rod 142 and having a marking element on its free end. With the arm 162 on armature 164 of relay 104 normally resting lightly on the stylus arm 158 marking element 160 reciprocates across the marking tape (later described), and capacitors 20 and 78 are oscillatingly tuned by the hunting assembly.

The operation of the units thus far described is as follows. Input 2 is coupled to the local oscillator of a broadcast receiver, and power supply leads 114, 114a are connected to the domestic power circuit which supplies the receiver. Motor 130 starts and drives the hunting assembly to tune capacitors 20, 78 back and forth across their ranges and, of course, to tune the Fig. 1 circuits continuously. Meanwhile, marking element 160 is likewise being continuously reciprocated across the recording tape which is also being driven as hereinafter detailed so that whenever capacitors 20 and 78 sharply tune their circuits into resonance with the local oscillator, relay 104 is energized and arm 162 snaps down for an instant to actuate marking element 160. As resonance is passed, spring arm 158 returns element 160 to non-marking height. Obviously, the local oscillator will be tuned a predetermined number of cycles off the main tuning of the receiver, for which allowances in calibration may be made. Also, in adjusting the hunting system, rack 148 may be disengaged from pinion 150 so that the desired indexing of shaft 152 relative to the remainder of the hunt assembly may be accomplished. In summary, every time the capacitors pass resonance with the local oscillators, a short mark will be made at a corresponding place on the tape and, with the tape being driven at a constant speed, a vertical row of marks for a certain distance will show that the receiver was tuned to some certain frequency for a corresponding time, and likewise another vertical row spaced laterally across the tape will show that the receiver was tuned to another frequency at and for another time.

The tape driving mechanism is arranged so that ordinarily the tape is driven by the synchronous electric motor but, when power interruption occurs, drive is obtained by an otherwise normally inoperative spring clock motor. Referring now to Figs. 2 and 8 to 11, inclusive, normal drive is obtained through flexible shaft 166 coupled through cam 132 to shaft 134 and, on the other end, through couplings 170 to a worm shaft 172 rotatably mounted by brackets 174 to an upright plate 175 of a reel frame 176 so as to mesh with and drive gear 180. The gear 180 is freely rotatable on a transverse shaft 182 as shown best in Fig. 9, the transverse shaft being rotatably mounted in a bearing 184 on plate 175. On its face, gear 180 carries a spring pawl 186 engageable with the teeth of a ratchet 188 rigidly affixed on shaft 182 to establish a driving connection between gear 180 and shaft 182 upon clockwise rotation of gear 180, as seen in Fig. 10, but leaving ratchet 188 and shaft 182 free to rotate clockwise relative to gear 180, in which case the gear is locked by worm 172.

Figure 3:
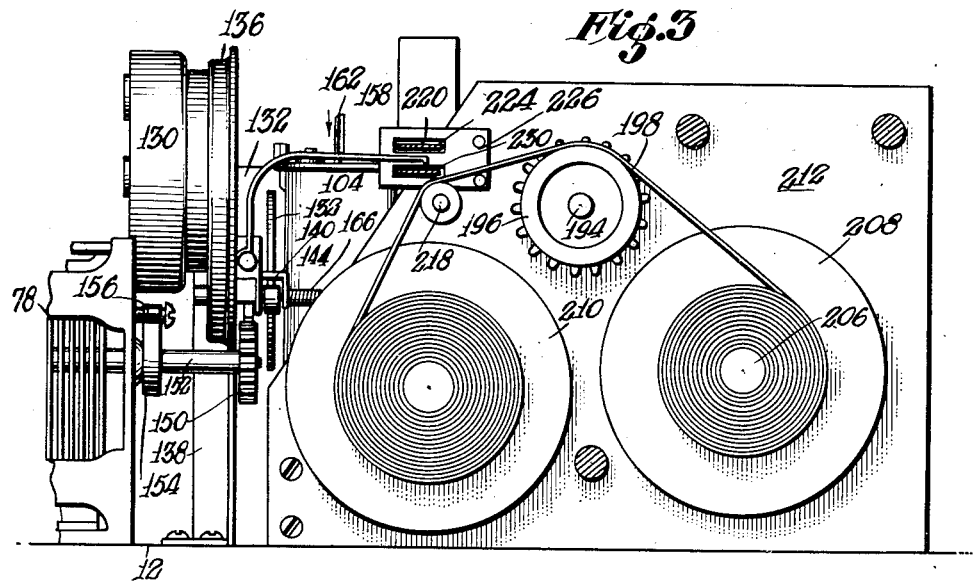
Fig. 3 is a side elevation partly broken away.
Figure 4:
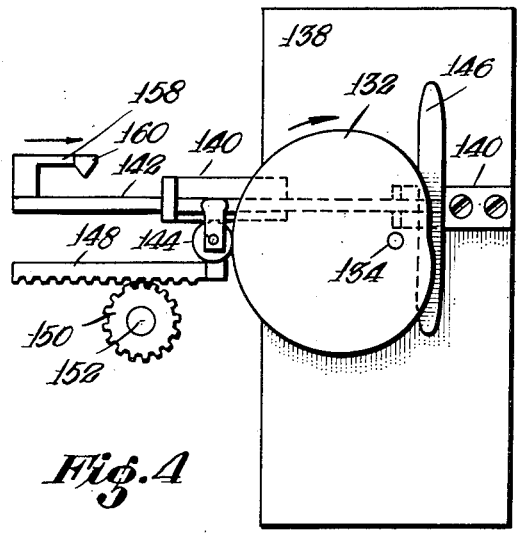
Fig. 4 is a diagrammatic elevation illustrating the hunt assembly.

On the inner end of shaft 182 is affixed a pinion 190 driving a gear 192 affixed on the shaft 194 of a toothed spool 196 which, in turn, drives a recording tape 198 as shown best in Figs. 3 and 6. Shaft 194 also has affixed thereon a pulley wheel 200 driving through a coil spring belt 202 another pulley 204 affixed on shaft 206 of a tape take-up reel 208 which, together with tape-supply reel 210, is rotatably supported between vertical plate 212 on the inside and plates 214, 216 on the outside of frame 176.

From supply reel 210, tape 198 is passed over a roller 218 where it is supported for marking. While any of the well-known modes of marking may be used, the one illustrated comprises an inked ribbon 220 passing from a supply spool 222 through the upper horizontal slot 224 of slotted guide plate 226, across the tape, around a guide pin 228, back through a lower horizontal slot 230, and to a take-up spool 232. If desired, means may be provided for driving the ribbon, such as a ratchet wheel on the shaft of the take-up spool and a pawl on the armature 164 so that whenever relay 104 is actuated, the take-up spool will be turned a short distance. In this example, the marking element 160 is disposed between the upper and lower courses of ribbon 220 so that when the element is snapped down, it will mark the tape.

In case of power interruption, shaft 182 is driven by a spring clock motor 234, the main shaft 236 of which is provided with a cross pin 238 fitting in a key slot 240 in the bars of ratchet 188, as shown in Figs. 9 and 10 so that when shaft 236 turns, shaft 182 is thereby rotated to drive the tape the same direction and rate as it would be driven by motor 130. However, when the current from the power supply 108 is on, the clock is held in disabled condition by the spring armature 240 of relay 126 which holds the escapement wheel 242 fixed. While clock motor 234 is disabled, the customary slip connection between clock shaft 236 and the remainder of the clock gearing allows the shaft to rotate with ratchet 188 then being driven by synchronous motor 130.

Figure 2:
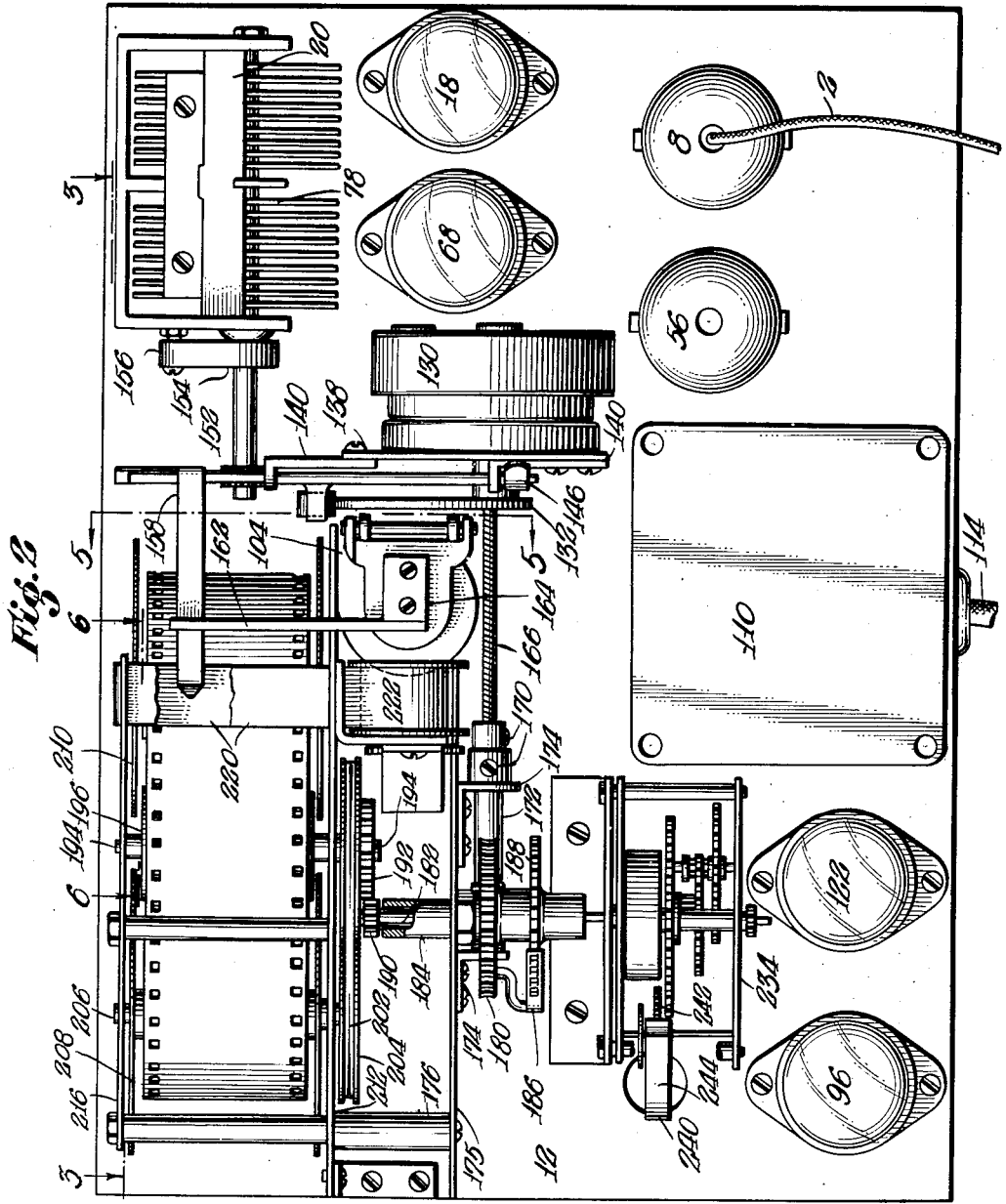
Fig. 2 is a plan view of the mechanical and electrical components.

As shown in Figs. 1, 2 and 6, current from power supply 108 actuates relay 126 so that the spring armature 240 lies in the full-line position with its curved end 244 clamped against escapement wheel 242. However, when the power supply is interrupted, armature 240, fulcrumed at 246, is snapped by spring 248 to its dotted line position, thus freeing escapement 240 and giving it an initial twirl to ensure starting. Thereupon, tape 198 is driven by the clock motor until the electric power goes on, whereupon relay 126 locks the clock and normal drive is resumed.

In the foregoing specification, one proven example of the concept has been detailed. However, the invention is not to be limited to the specific disclosure, but encompasses the full breadth and scope of the following claims.

I claim:

1. In combination an electric motor, a power supply circuit for said electric motor, a driving element for said electric motor, a driven shaft, a one-way clutch connecting said driving element and said driven shaft, a spring clock motor having a drive shaft connected to driven shaft and having a slip connection with the remainder of said spring motor, a relay actuated by said power supply circuit and having an armature frictionally and generally tangentially engageable with the escapement wheel of said clock motor for holding the same inoperative in response to power in said circuit, and spring means for normally biasing said armature away from engagement with said escapement wheel, whereby to release said escapement wheel and positively to start the same upon interruption of power in said circuit.

2. The combination claimed in claim 1, said electric motor having a driving shaft and irreversible gearing connecting said one-way clutch and the drive shaft of the electric motor, whereby to prevent rotation of the electric motor drive shaft when said auxiliary motor is driving.

3. The combination claimed in claim 1, said auxiliary motor including a drive shaft connected to the driven shaft and slip-connected to the driving elements therefor, said irreversible gearing comprising a worm gear on the drive shaft of said electric motor, said driving element comprising a pinion rotatably mounted with respect to the driven shaft and meshing with said worm gear, said one-way clutch comprising a pawl and ratchet operatively connecting said pinion and said recording medium shaft.

JOHN T. POTTER.